US012780105B2

(12) United States Patent
Asquith et al.

(10) Patent No.: US 12,780,105 B2
(45) Date of Patent: Nov. 3, 2026

(54) ASSEMBLY FOR A LOAD SUPPORTING STRUCTURE FOR A VEHICLE

(71) Applicant: RHINO RACK AUSTRALIA PTY LIMITED, New South Wales (AU)

(72) Inventors: Warren Hayden Asquith, New South Wales (AU); Adam Connellan, New South Wales (AU)

( * ) Notice: Subject to any disclaimer, the term of this patent is extended or adjusted under 35 U.S.C. 154(b) by 1574 days.

(21) Appl. No.: 17/268,391

(22) PCT Filed: Aug. 13, 2019

(86) PCT No.: PCT/AU2019/050841
§ 371 (c)(1),
(2) Date: Feb. 12, 2021

(87) PCT Pub. No.: WO2020/033995
PCT Pub. Date: Feb. 20, 2020

(65) Prior Publication Data
US 2026/0192754 A1 Jul. 9, 2026

(30) Foreign Application Priority Data
Aug. 14, 2018 (AU) ................................ 2018902975

(51) Int. Cl.
*B60R 9/045* (2006.01)
*B60R 9/058* (2006.01)

(52) U.S. Cl.
CPC .............. *B60R 9/045* (2013.01); *B60R 9/058* (2013.01)

(58) Field of Classification Search
CPC ................................ B60R 9/045; B60R 9/058
(Continued)

(56) References Cited

U.S. PATENT DOCUMENTS 3,253,755 A * 5/1966 Bott ........................ B60R 9/045 224/326
3,519,178 A * 7/1970 Stephen ................. B60J 1/2008 224/326
(Continued)

FOREIGN PATENT DOCUMENTS

AU 2015101091 9/2015
CN 204279254 4/2015
(Continued)

OTHER PUBLICATIONS

CN 204279254 U; "Vehicle Top Luggage Assembly"; Hu, G.; Dec. 11, 2014 (Year: 2014).*
(Continued)

*Primary Examiner* — Nathan J Newhouse
*Assistant Examiner* — Lester L Vanterpool
(74) *Attorney, Agent, or Firm* — Kritzer McPhee LLP

(57) ABSTRACT

An assembly for a load supporting structure for a vehicle which includes, a support frame adapted to be connected to the vehicle, which comprises two longitudinally extending side rails, a front rail and a rear rail, each of the side rails having at least one channel longitudinally extending along at least a portion of the length of the underside surface thereof, and which faces the vehicle. The assembly also includes a plurality of modular longitudinal base elements, one or more mounting bars adapted to mount the load supporting structure to the vehicle wherein at least one of the one or more mounting bars is slidable forward and aft at least partially along the length of the longitudinally extending channels of the side rails and base elements.

8 Claims, 6 Drawing Sheets

(58) Field of Classification Search
USPC .................................................. 224/321, 319
See application file for complete search history.

(56) References Cited

U.S. PATENT DOCUMENTS

| | | | | | |
|---|---|---|---|---|---|
| 3,722,765 | A * | 3/1973 | Binding | B60R 9/04 224/325 |
| D770,358 | S * | 11/2016 | Fernandez | D12/401 |
| D777,080 | S * | 1/2017 | Cropley | D12/412 |
| 9,718,410 | B2 * | 8/2017 | Cropley | B60R 9/058 |
| D831,147 | S * | 10/2018 | Cropley | D21/834 |
| D873,760 | S * | 1/2020 | Connellan | D12/412 |
| D877,686 | S * | 3/2020 | Connellan | D12/412 |
| D878,277 | S * | 3/2020 | Connellan | D12/412 |
| D878,278 | S * | 3/2020 | Connellan | D12/412 |
| D879,013 | S * | 3/2020 | Connellan | D12/406 |

FOREIGN PATENT DOCUMENTS

| | | | | |
|---|---|---|---|---|
| CN | 205059447 | | 3/2016 | |
| CN | 206202150 | | 5/2017 | |
| EP | 1205357 | | 5/2002 | |
| EP | 1205357 | A2 * | 5/2002 | B60R 9/045 |
| GB | 885186 | | 12/1961 | |
| JP | 10100802 | | 4/1998 | |
| RU | 180780 | | 1/2006 | |

OTHER PUBLICATIONS

EP-1205357-A2; "Roof-Rack, for Motobr Vehicle, Has Two Extending Structures Formed by Two Horizontal Profiles Conneced by Vertical Profiles That Can Be Displaced in Longitudainal Direction by Loosening Headless Screws Using Allen Key"; Van Den Born, Marcus Philippu; B60R9/045; May 15, 2002 (Year: 2002).*

WO 2012016291 A1; Improved Load Supporting Structure for a Vehicle; Cropley, Richard; Feb. 9, 2012 (Year: 2012).*

DE 202013103414 U1; "Roof Rack for a Motor Vehicle"; Dennig, Stephan; Aug. 26, 2013 (Year: 2013).*

AU 2015101091 A4; "Improvements in Roof Tray Design"; Drapier, Ian John; Sep. 24, 2015 (Year: 2015).*

CN 204279254 U; "Vehicle Top Luggage Assembly"; Hu, G.; Apr. 22, 2015 (Year: 2015).*

CN 206202150 U; "Roof Frame Structure of Vehicle, Has Upper Frame That Is Connected to Lower Frame by Fixing Card, and Load Bearing Strip That Is Fixed to Lower Frame Main Casing and Support Pipe That is Provided Below Load Bearing Bar"; Zong, Ping; May 31, 2017 (Year: 2017).*

Backbone Amarok, https://youtube.com/watch?v=dgGTWcNqm_w.

* cited by examiner

ASSEMBLY FOR A LOAD SUPPORTING STRUCTURE FOR A VEHICLE

TECHNICAL FIELD

The present invention generally relates to an assembly for a load supporting structure for a vehicle.

BACKGROUND TO THE INVENTION

Roof racks are one generic name for load-bearing structures that are used to support a load above a roof of a vehicle, thereby increasing the cargo carrying capacity of the vehicle. A roof rack typically comprises a basal structure to which are attached at least a pair of 'legs' or 'towers', which are connected to and arranged at opposed sides of a roof of a vehicle. The connector assemblies are often releasably connected or mounted to the roof to allow removal of the roof rack when not required. This is generally desirable as the roof rack affects the aerodynamics of the vehicle, resulting in fuel consumption increasing.

Roof racks are available in a multitude of configurations, depending upon the intended cargo. For example, a roof rack may further comprise a 'cargo platform' surface, being a wide, flat platform (which may be at least partially enclosed by side rails) upon which cargo may be laid. 'Cargo platform' type roof racks often feature structures enabling ropes or strapping to be attached so as to secure the cargo to the roof rack. There are also 'box' type roof racks, which comprise enclosed container mounted to the roof of the vehicle—the advantage of these is that there is less need for rope and other securement means, as any cargo is enclosed. Another common form of roof rack comprises a roof-mounted bicycle rack, providing a means of transporting bicycles.

Many vehicles that are suitable to receive a roof rack will contain mounting fixtures within their roof to which the connector assembles of a roof rack may be connected and/or mounted. However, these mounting fixtures may differ between brand, model and generation, and may even be added, removed or altered as requested by the owner at the time of purchasing the vehicle. There are even optional means of mounting structures to the roof of a vehicle that does not typically comprise any mounting fixtures, such as structural modification or temporary clamping means. These may either be a specialised type of connector assembly, or may be used to provide mounting fixtures (either permanent or temporary) upon the roof of a vehicle that otherwise does not comprise any.

This variation in mounting fixtures across vehicles can make it difficult to manufacture a roof rack or other vehicle roof mounted assembly, which has to be able to be accommodated on a range of different vehicles roofs. It is both difficult and impractical to attempt to implement a standard type and arrangement of fixtures within the automotive industry. This is because different mounting fixture types may be developed according to differing needs, and the arrangement is determined based on the stylistic choice, the design of the vehicle's roof, and structural concerns such as the most suitable load-bearing points on the vehicle.

In particular, prior art vehicle roof platforms, which include a support frame, a plurality of base elements or slats and one or mounting bars—both for mounting the slats and support frame to the mounting fixture of the vehicle, and to provide structural support and rigidity to the platform, require pre-determined engagement positions for the mounting bars to be secured to the side rails of the support frame.

These pre-determined engagement positions are essentially determined by the design of the vehicles to which the roof racks are to be affixed.

As shown in FIG. 1, which depicts a side rail of a prior art roof platform for a vehicle, these pre-determined engagement positions are often machined into a mounting flange or lip of the side rails.

As discussed above, there are many different vehicle mounting fixtures that may differ between brand, model and generation, and so it can be quite complex to machine appropriate engagement positions for the mounting bars on the side rails for all makes, models and brands of different vehicles. With all of the different variations of vehicles and mounting fixtures, as well as different combinations of connector assemblies that can be used for the roof racks, a large number of unique parts are required to suit consumer needs.

Accordingly, there is a need for a roof rack or roof rack assembly that is able to be adapted to a wide range of mounting fixture types and arrangements.

DEFINITIONS

As used herein, the term "roof rack" is used as a general term to refer to any structure, apparatus or assembly that is mounted, affixed or otherwise attached to the roof of a vehicle for the purpose of improving the ability of the vehicle to transport cargo. This includes, but is not limited to, 'platform' type roof racks, luggage pods/roof boxes, roof bags, roof trays, bicycle racks and any other roof-mounted cargo carrying system, apparatus and assembly for a vehicle.

SUMMARY OF THE INVENTION

According to a first aspect of the invention there is provided an assembly for a load supporting structure for a vehicle which includes, a support frame adapted to be connected to the vehicle, the support frame comprising two longitudinally extending side rails, a front rail and a rear rail, each of the side rails having at least one channel longitudinally extending along at least a portion of the length thereof; a plurality of modular longitudinal base elements, each having at least one channel longitudinally extending along at least a portion of the length thereof; one or more mounting bars, which extend laterally between the two side rails, and which is adapted to be connected to the side rails and the base elements by a plurality of connector assemblies; wherein at least one of the one or more mounting bars is slidable forward and aft at least partially along the length of the longitudinally extending channels of the side rails and base elements.

Preferably, the one or more mounting bars can be positioned at any location forward or aft along the length of the longitudinally extending channels of the side rails and base elements.

When each of the connector assemblies are unlocked, the one or more mounting bars can be slid along the length of the longitudinally extending channels of the side rails and base elements in order to position the one or more mounting bars at a desired position.

Conversely, when each of the connector assemblies are locked, the one or more mounting bars are secured at the desired position along the length of the longitudinally extending channels of the side rails and base elements.

Each of the connector assemblies includes a flat base portion adapted to be received in the longitudinally extending channels and having an engagement surface adapted to urge against an interior surface of the channels, the base portion is further connected to a threaded post extending from the engagement surface, which is adapted to receive a nut on the distal end thereof, the nut can be tightened onto the threaded post to lock to connector assembly, thereby urging the engagement surface of the base against the interior channel surface to secure the mounting bars in the desired position, and where the nut can be loosened from the threaded post to unlock the connector assembly, thereby allowing the mounting bars to be slid forward and aft along the length of the longitudinally extending channels of the side rails and base elements.

Preferably, the at least one channel longitudinally extends along at least a portion of the length of an underside surface of the longitudinal base elements.

Preferably, the at least one channel longitudinally extends along at least a portion of the length of an underside surface of the side rails.

Preferably, the longitudinal base elements and the side rails include two channels.

Preferably, the internal thread of the threaded post of the connector assembly includes a 30° wedge ramp at the root thereof to provide vibration resistance, whereby the nut does not become loosened from the threaded post by vibrations caused by the movement of the vehicle.

The present invention provides an assembly for a load supporting structure for a vehicle. Such load supporting structures can be used to carry various types of cargo on the exterior of the vehicle and potentially provide a greatly increased load carrying capacity of the vehicle. In one embodiment, the roof rack is a roof rack platform. Other roof racks, including but not limited to roof boxes, bicycle racks, roof trays and luggage pods are also within the scope of the present invention.

Each of the ‘legs’ or ‘towers’, can be adjusted with respect to the assembly for a load supporting structure for a vehicle, so as to accommodate different fixtures with various spacings between them across the vehicle roof. The fixtures may comprise roof-mounted rails, tracks or grooves, discrete fixture points or other fixture types, including temporary or demountable fixtures that clamp or strap onto a part of the vehicle structure.

In an alternate embodiment wherein the vehicle comprises no fixtures, the ‘leg’ or ‘tower’ may comprise a temporary fixture means or otherwise be adapted to directly connect to the vehicle structure. In such an embodiment, the position of each leg or tower connector assembly can be adjusted with respect to the assembly for a load supporting structure for a vehicle so as to accommodate structural differences between vehicles.

Each leg or tower can be adjusted with respect to the assembly for a load supporting structure for a vehicle so as to accommodate the various lengths of different rails or grooves/tracks on the vehicle roof. The ability to adjust the position of each of the connector assemblies can mean that the roof rack is more easily accommodated on a range of vehicles, since the location of each connector assembly can be modified to suit the connecting fixtures provided on the specific vehicle. This may enable at least one embodiment of the present invention to be adapted to a wide range of roofed vehicles without the need to structurally alter the roof rack or at least partially disassemble and reassemble it in a new configuration.

In one embodiment of the present invention, a plurality of mounting bars that are aligned with a lateral axis of the vehicle are provided. At least one of the mounting bars may be slidable, such that its longitudinal position forward and aft relative to the longitudinal length of the side rails and base elements is adjustable. At least one connector assembly is mounted to each of the mounting bars and is oriented to enable mounting of the roof rack to the vehicle.

In a further embodiment, the underside of the side rails and the base elements each comprise at least one channel extending longitudinally for at least a portion of the length thereof. Each channel may, in a further embodiment, have an entry aperture at an end of the channel. The channel may be adapted to receive a complementary projection that is able to slidably move along the channel. The channel may be adapted to prevent the complementary projection from exiting the channel except for at the entry aperture. In an embodiment, at least one of the slidable mounting bars may comprise at least a pair of complementary projections, which may enable the slidable mounting bar to slide longitudinally with respect to the roof rack base.

In a further embodiment, the complementary projection may be further configured to be selectively securable, and when secured, the sliding movement of the complementary projection within the channel is inhibited. This may enable each sliding mounting bar to be slid along a part of the length of the slats of the base elements to a desired longitudinal position forward and aft before securing the complementary projection, thereby securing the mounting bar into place. The location of each sliding mounting bar is therefore longitudinally adjustable along the forward and aft length of the side rails and base elements of the assembly. A connector assembly (or assemblies) can be affixed to a respective sliding mounting bar. The location of each connector assembly is therefore longitudinally adjustable with respect to the roof rack platform.

An advantage of the use of the sliding mounting bars, when the channels are arranged so that their longitudinal axis is from front to rear of the vehicle, is that different lengths of vehicles can be accommodated.

In addition, different vehicles—which may be of similar length—may have different structural properties. This may mean that the structural integrity of different roofs may vary widely, and as a result so will the optimum points for mounting of a roof rack upon the roof of the vehicle. Forward and aft longitudinal adjustment may allow for the present invention to be adapted or reconfigured to account for the structural properties of a wide range of vehicle roofs, without the need for machining, custom design or at least partial disassembly and reassembly of the roof rack. Therefore, the longitudinal position of the connector assembly (or assemblies) may be adjusted so as to affix or connect to a structurally suitable position on the roof of the vehicle.

In an embodiment, each mounting bar may further comprise a mounting track extending for at least a portion of an underside of the mounting bar. The mounting track can have entry aperture(s) arranged on the track. The track can run all (or some) of the length of each sliding mounting bar, thereby allowing a complementary projection to be inserted—initially into an entry aperture—into the mounting track. Once the sliding mounting bar is affixed to the slats to form the platform, each mounting track will extend laterally with respect to the roof rack platform. A connector assembly can comprise a complementary projection for insertion into the track. The connector assembly may therefore be able to be mounted (via the projection) into the laterally-extending mounting track of the sliding mounting bar. A lateral position of the mounting leg is thereby adjustable to a plurality of positions along the mounting track.

By the arrangement as described above, each connector assembly can be affixed to a respective lateral track in the longitudinally movable sliding mounting bar. The location of each connector assembly is therefore also laterally adjustable with respect to the roof rack platform.

In an optional embodiment, the entry aperture in the mounting track is disposed at a location that is easily accessible once the platform has been assembled. With this in mind, the entry aperture(s) may be located at the ends of the sliding mounting bar. Alternatively, or in addition, the entry aperture can be disposed along the length of the track. When the aperture is in the length of the track, the aperture can be a part of the track that is slightly wider than other parts of the track, the wide part to accommodate the insertion of the projection, and the narrower part to hold the projection so it cannot escape from the track.

This may enable for a given roof rack of a particular size to be mounted to vehicles with differing roof widths, and in particular to different vehicles with differing lateral spacing between the rooftop mounting fixtures to which the connector assemblies connect, without requiring the at-least partial disassembly and reassembly of the roof rack base.

BRIEF DESCRIPTION OF THE DRAWINGS

Embodiments of the invention will now be described with reference to the following drawings, which are intended to be exemplary only so as to improve and understanding of the invention and in which.

The drawings are not shown to scale and are for illustrative purposes only.

DETAILED DESCRIPTION OF PREFERRED EMBODIMENTS

Reference throughout this specification will be made to the present invention being employed in conjunction with vehicles such as road vehicles. In specific embodiments, the invention is described as being used in relation to 4WD, utility or off road vehicles. However, those skilled in the art should appreciate that the present invention may be used with a range of vehicle ranging from vans, cars, motor homes or any number of a range of road based vehicles. Potentially, the invention could also be used with water vessels or rail carriages in other embodiments if required.

Figure 1:
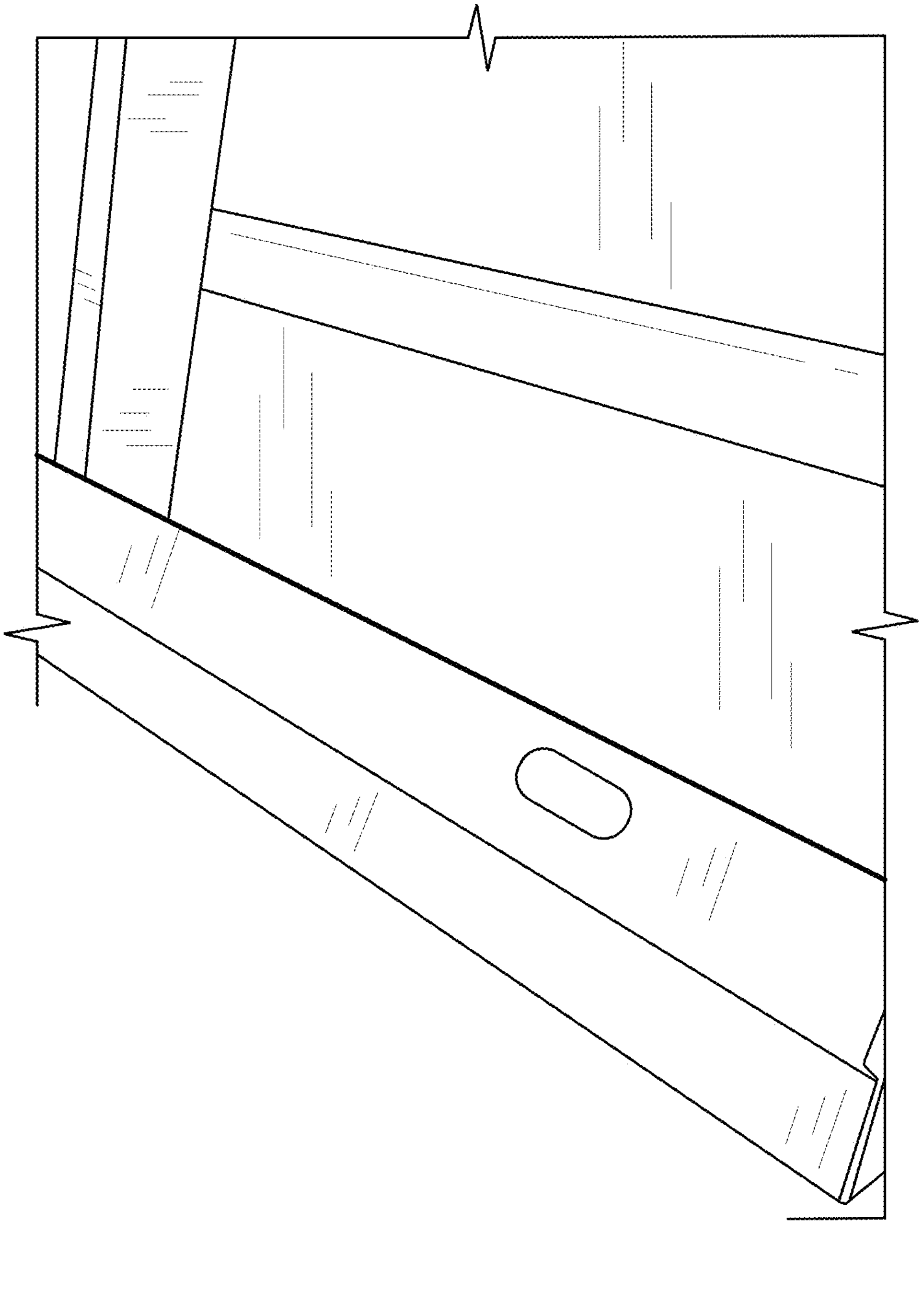
FIG. 1 PRIOR ART
FIG. 1 is a perspective view of a prior art roof rack platform showing the pre-machined fixed mounting bar engagement positions.
Figure 2:
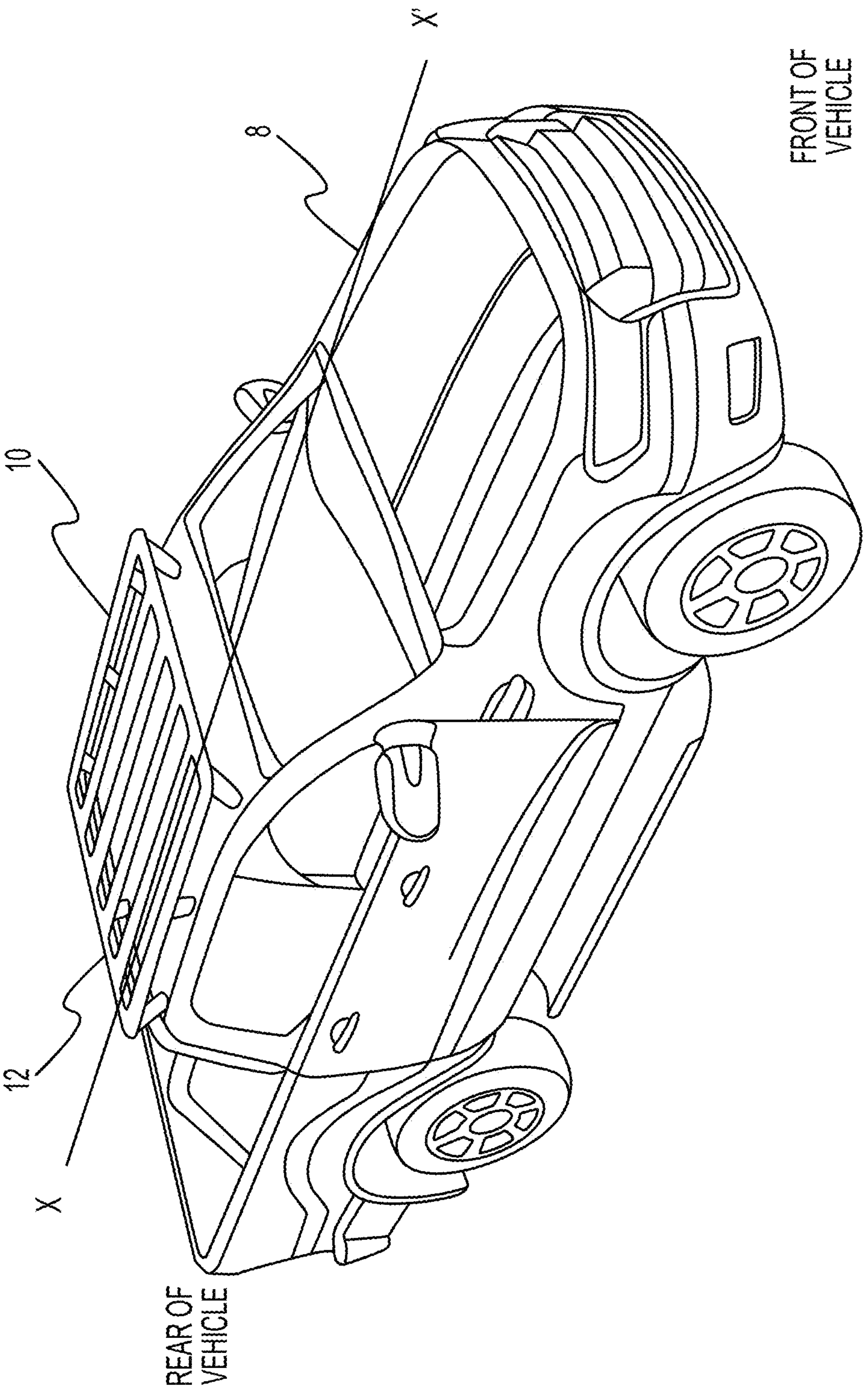
FIG. 2 is a perspective view of a vehicle having a roof rack mounted thereon.

FIG. 2 shows a vehicle 8 with a platform-type roof rack, comprising an assembly for a load supporting structure for a vehicle 10 that also doubles as a platform, thereby providing a surface on which cargo or loads (not shown) may be placed to be supported. The load supporting structure 10 is formed by an array of base elements being slats or planks 12 aligned with respect to one another.

Figure 3:
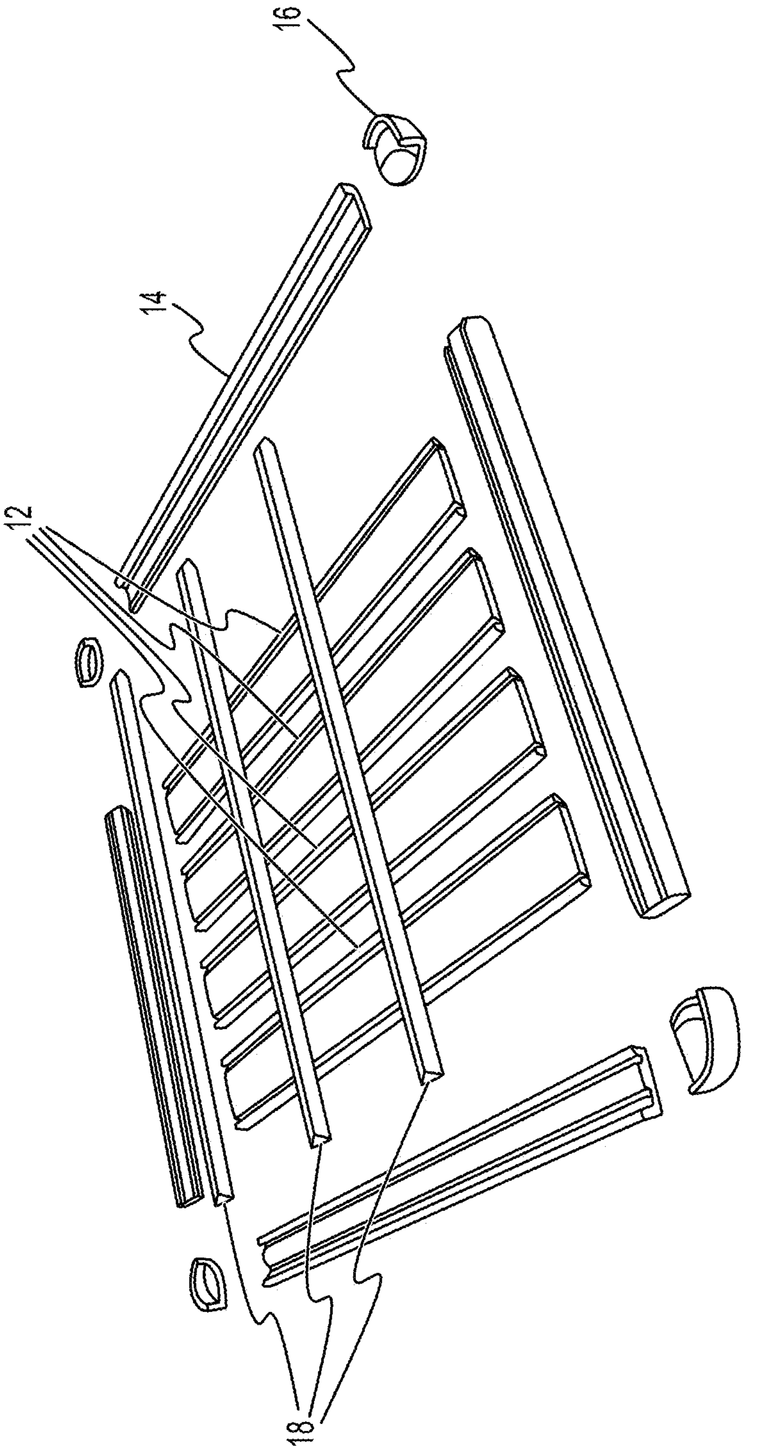
FIG. 3 is an exploded view of a roof rack platform prior to assembly.

In FIG. 3 there are shown four slats 12. The four slats 12 are aligned longitudinally along a longitudinal axis X-X' of the vehicle (front to back of the vehicle) to form the body of the load supporting structure 10. While four slats 12 are shown, it should be understood that there can be any number of slats so as to provide the load supporting structure 10.

Figure 4:
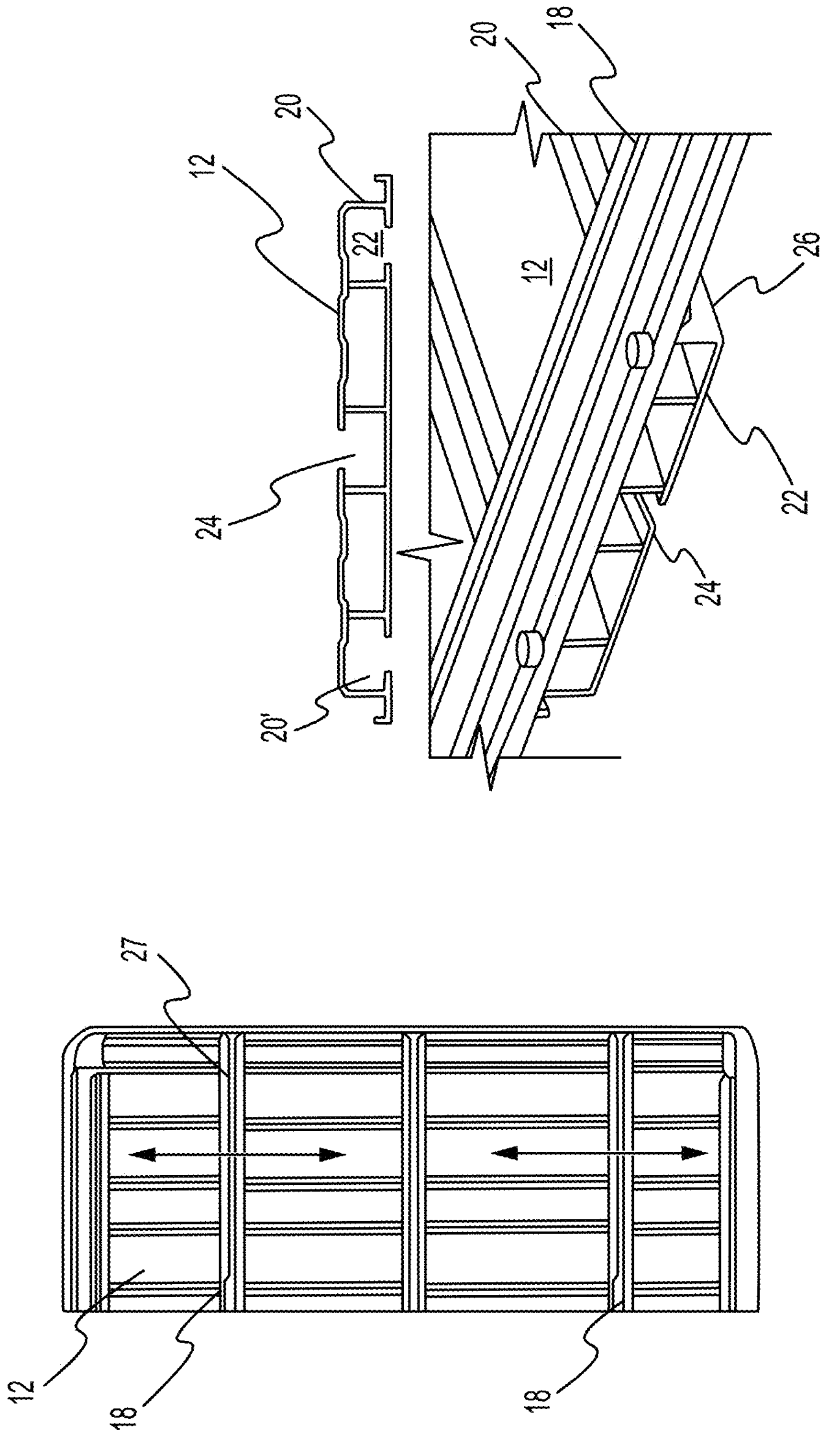
FIG. 4 is a top view of a part of the platform once assembled, and a close up view of an embodiment of the sliding bar mounted to the slats.

The load supporting structure 10 is shown prior to assembly in FIG. 4. FIG. 4 is therefore an exploded view of the various components. The four slats 12 of the roof rack platform can be fixed relative to one another by a plurality of mounting bars 18. In FIG. 3 there are shown three mounting bars 18. However, it should be understood that there can be any number of mounting bars. Also shown in FIG. 3 are the side rails 14, front and rear rails and the corner pieces 16 that are all required to form the platform of the load supporting structure 10.

The load supporting structure 10 has been assembled in the left-hand image of FIG. 4. Each of the mounting bars 18 are slidable, although at least one of the mounting bars 18 can be a fixed mounting bar. Indeed, more than one fixed mounting bar could be located across the slats, each of the more than one fixed mounting bar could be away from the middle part of the slats and instead spaced at some other distance, but so as to still provide some stability.

The slidable mounting bars 18 can be positioned at any location forward or aft along the length of the side rails 14 and base elements 12 of the assembly of the present invention.

A further embodiment of the present invention may comprise additional mounting bars 18, which may be used in order to help distribute cargo weight more evenly, or for larger roof racks that necessitate additional connections for stability.

The top side of the slat 12 can have an upper slot 24. Upper slot 24 has use once the platform is mounted to the vehicle and it is not discussed further.

The underside of each of the longitudinal slats 12 can comprise longitudinal channels 20. The cross-sectional profile of a slat 12 is shown to the right of FIG. 4. A close up part perspective view of the slat 12 is shown with a mounting bar 18 in place.

As shown in FIG. 4, each slat 12 can comprise a set of channels 20, 20' arranged as a pair. However, any number of channels can be arranged on each slat, from one channel per slat to more than one channel per slat. The channels 20 can run the entire length of each longitudinal slat 12. Alternatively, the channels 20 can run for only a part of the length of the slat 12. There can be more than one channel along the length so as to provide part channels, with interruptions between each part channel. Each channel 20 preferably runs the length of the desired adjustment distance along the longitudinal slat 12. To allow for maximum flexibility in positioning of the sliding mounting bar 18, a channel 20 is arranged along the whole length of the slat 12 without interruption.

Each longitudinal channel 20 can have entry apertures at either ends of the slat 12 (as shown) to allow for access to the channel. The entry apertures allow for insertion of a connector assembly, which includes a base portion or plate 22, which can be secured into position with a nut and threaded post or bolt 26. The plate 22 and nut and threaded post or bolt 26 together secure a flange or web on the sliding mounting bar 18. Each sliding mounting bar 18 can be slid along a part of the length of the slats 12 to the desired position on the roof rack base 10 before securing the sliding mounting bar 18 into place.

In this way, the mounting bars 18 can be positioned at any location forward or aft along the length of the longitudinally extending channels 20 of the side rails 14 and slats 12 of the base elements.

When the connector assemblies comprising the plate 22 and nut and threaded post or bolt 26 are unlocked, the one or more mounting bars 18 can be slid along the length of the longitudinally extending channels 20 in order to position the one or more mounting bars at a desired position.

Conversely, when the connector assemblies comprising the plate 22 and nut and threaded post or bolt 26 are locked, the one or more mounting bars 18 are secured at the desired position along the length of the longitudinally extending channels 20.

The base portion or plate 22 of the connector assemblies is adapted to be received in the longitudinally extending channels 20 and has an engagement surface adapted to urge against an interior surface of the channels. The threaded post or bolt 26 extends from the engagement surface of the plate 22, and is adapted to receive the nut on the distal end thereof. The nut can be tightened onto the threaded post or bolt 26 to lock to connector assembly, thereby urging the engagement surface of the plate 22 against the interior channel surface to secure the mounting bars 18 in the desired position. Where the nut is loosened from the threaded post or bolt 26 to unlock the connector assembly, the mounting bars 18 can be slid forward and aft along the length of the longitudinally extending channels 20 of the side rails 14 and slats 12 of the base elements.

The internal thread of the threaded post or bolt 26 includes a 30° wedge ramp at the root thereof to provide vibration resistance. In this way, the likelihood of the nut become loosened from the threaded post or bolt 26 by vibrations caused by the movement of the vehicle is minimised. This is a proprietary system of Stanley Engineered Fastening, which provides a technologically-superior fastening system ideally suited for threaded joint applications subjected to heavy vibration and challenging environments.

The location of each sliding mounting bar 18 is therefore longitudinally adjustable along the forward and aft length of the slats 12 and side rails 14.

Figure 5:
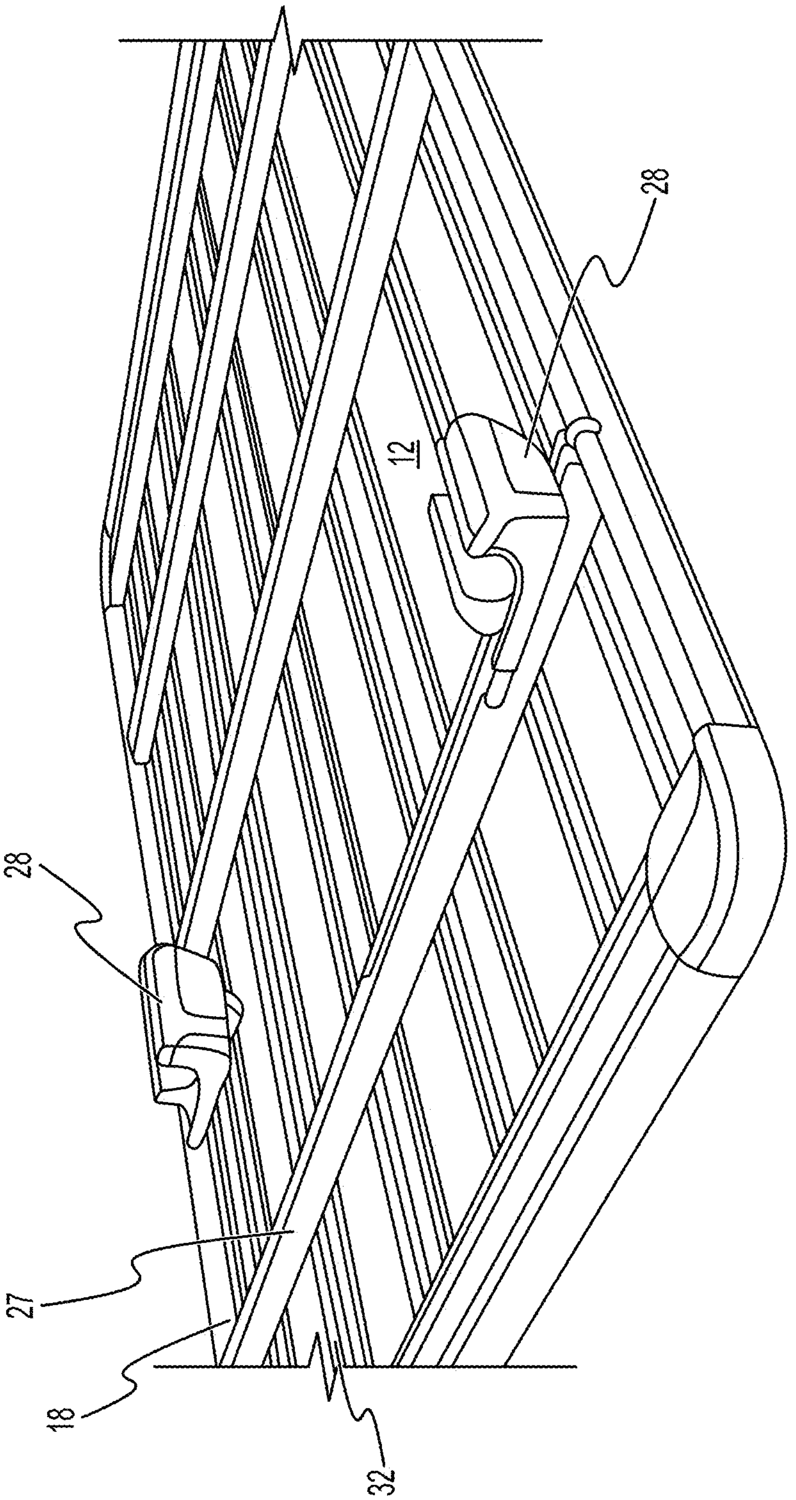
FIG. 5 is a perspective view of the platform once assembled, during assembly of the legs.

Each sliding mounting bar 18 further comprises a mounting track 27 extending for at least a portion of an underside of the mounting bar 18. This is best seen in FIG. 5. A leg or tower 28, can be affixed to a respective sliding mounting bar 18 via the track 27. Two legs 28 are shown in different positions in FIG. 5. One connecting assembly is shown attached to the sliding mounting bar 18, where the other is shown in a position coming towards the sliding mounting bar 18.

The location of each connecting assembly 28 is therefore longitudinally adjustable with respect to the load supporting structure 10 by means of movement forward and aft of the sliding mounting bar 18. Furthermore, each leg 28, can be affixed to a respective lateral track 27 in the longitudinally movable sliding mounting bar 18. Therefore the location of each leg 28 is therefore also laterally adjustable with respect to the load supporting structure 10. The mounting track 27 is shown extending across the entire underside of the mounting bar 18. In some embodiments, only a part of the mounting bar 18 comprises a track 27. Each track 27 preferably runs the length of the desired adjustment distance along the sliding mounting bar 18.

Figure 6:
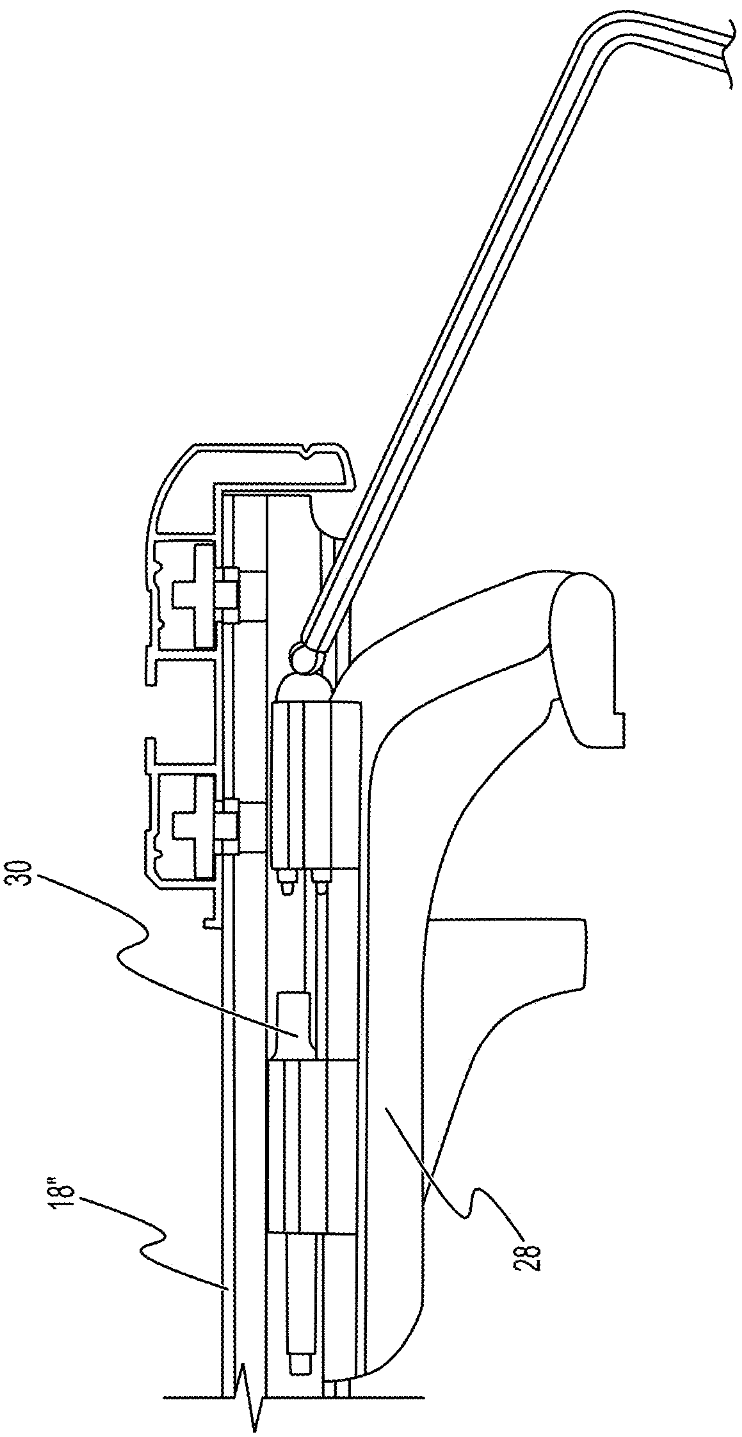
FIG. 6 is a close up of a leg according to one embodiment.

The mounting track 27 can have entry aperture(s) 32 arranged on the track. Each leg 28, can comprise a complementary projection 30 for insertion into the track 27. In FIG. 6, an entry aperture 32 is disposed along the length of the track. The aperture 32 is a part of the track 27 that is slightly wider than other parts of the track 27, the wide part of the track 27 to accommodate the insertion of the projection 30, and the narrower part of the track 27 to hold the projection so it cannot escape from the track.

Referring now to FIG. 6, there is shown a further advantage of at least one embodiment of the present invention. An embodiment of the complementary projection 30 of the leg 28 is shown within a cutaway of the channel 20 of a mounting bar 18. The complementary projection 30 enables the connecting assembly 28 to be slid along the channel 20. Upon reaching a desired lateral position, the complementary projection 30 may be secured, thereby inhibiting further lateral movement of the connecting assembly 28. As depicted in FIG. 6, this may be through the use of an Allen key, particularly a ball-end Allen key adapted to reach into the channel and engage with the complementary projection 30.

The skilled person will appreciate that the present invention is not limited to any one type of roof rack, and that the present invention may be adapted for transport of different types of cargo without departing from the scope or object thereof.

In this specification, unless the context clearly indicates otherwise, the term "comprising" has the non-exclusive meaning of the word, in the sense of "including at least" rather than the exclusive meaning in the sense of "consisting only of". The same applies with corresponding grammatical changes to other forms of the word such as "comprise", "comprises" and so on.

While the invention has been described with reference to preferred embodiments above, it will be appreciated by those skilled in the art that it is not limited to those embodiments, but may be embodied in many other forms, variations and modifications other than those specifically described. The invention includes all such variation and modifications. The invention also includes all of the steps, features, components and/or devices referred to or indicated in the specification, individually or collectively and any and all combinations or any two or more of the steps or features. It will be apparent that obvious variations or modifications may be made which are in accordance with the spirit of the invention and which are intended to be part of the invention, and any such obvious variations or modifications are therefore within the scope of the invention.

Other definitions for selected terms used herein may be found within the detailed description of the invention and apply throughout. Unless otherwise defined, all other scientific and technical terms used herein have the same meaning as commonly understood to one of ordinary skill in the art to which the invention belongs.

What is claimed is:

1. An assembly for a load supporting structure for a vehicle which includes, a support frame adapted to be connected to the vehicle, the support frame comprising two longitudinally extending side rails, a front rail and a rear rail, each of the side rails having at least one channel longitudinally extending along at least a portion of the length of the underside surface thereof, which faces the vehicle;

a plurality of modular longitudinal base elements, each having at least one channel longitudinally extending along at least a portion of the length of the underside surface thereof, which faces the vehicle;

one or more mounting bars adapted to mount the load supporting structure to the vehicle, which extend laterally between the two side rails, and which are adapted to be connected to the side rails and the base elements via the respective longitudinally extending channels therein by a plurality of connector assemblies;

wherein at least one of the one or more mounting bars is slidable forward and aft at least partially along the length of the longitudinally extending channels of the side rails and base elements.

2. The assembly for a load supporting structure for a vehicle of claim 1 wherein the one or more mounting bars can be positioned at any location forward or aft along the length of the longitudinally extending channels of the side rails and base elements.

3. The assembly for a load supporting structure for a vehicle of claim 1 wherein when each of the connector assemblies are unlocked, the one or more mounting bars can be slid along the length of the longitudinally extending channels of the side rails and base elements in order to position the one or more mounting bars at a desired position.

4. The assembly for a load supporting structure for a vehicle of claim 2 wherein when each of the connector assemblies are locked, the one or more mounting bars are secured at the desired position along the length of the longitudinally extending channels of the side rails and base elements.

5. The assembly for a load supporting structure for a vehicle of claim 3 wherein each of the connector assemblies includes a flat base portion adapted to be received in the longitudinally extending channels and having an engagement surface adapted to urge against an interior surface of the channels, the base portion is further connected to a threaded post extending from the engagement surface, which is adapted to receive a nut on the distal end thereof, the nut can be tightened onto the threaded post to lock to connector assembly, thereby urging the engagement surface of the base against the interior channel surface to secure the mounting bars in the desired position, and where the nut can be loosened from the threaded post to unlock the connector assembly, thereby allowing the mounting bars to be slid forward and aft along the length of the longitudinally extending channels of the side rails and base elements.

6. The assembly for a load supporting structure for a vehicle of claim 1 wherein the at least one channel longitudinally extends along at least a portion of the length of an underside surface of the longitudinal base elements.

7. The assembly for a load supporting structure for a vehicle of claim 1 wherein the at least one channel longitudinally extends along at least a portion of the length of an underside surface of the side rails.

8. The assembly for a load supporting structure for a vehicle of claim 1 wherein the longitudinal base elements and the side rails include two channels.

* * * * *